W. L. Horne.
Steam Water Power Device.
No 56,416. Patented July 17, 1866.
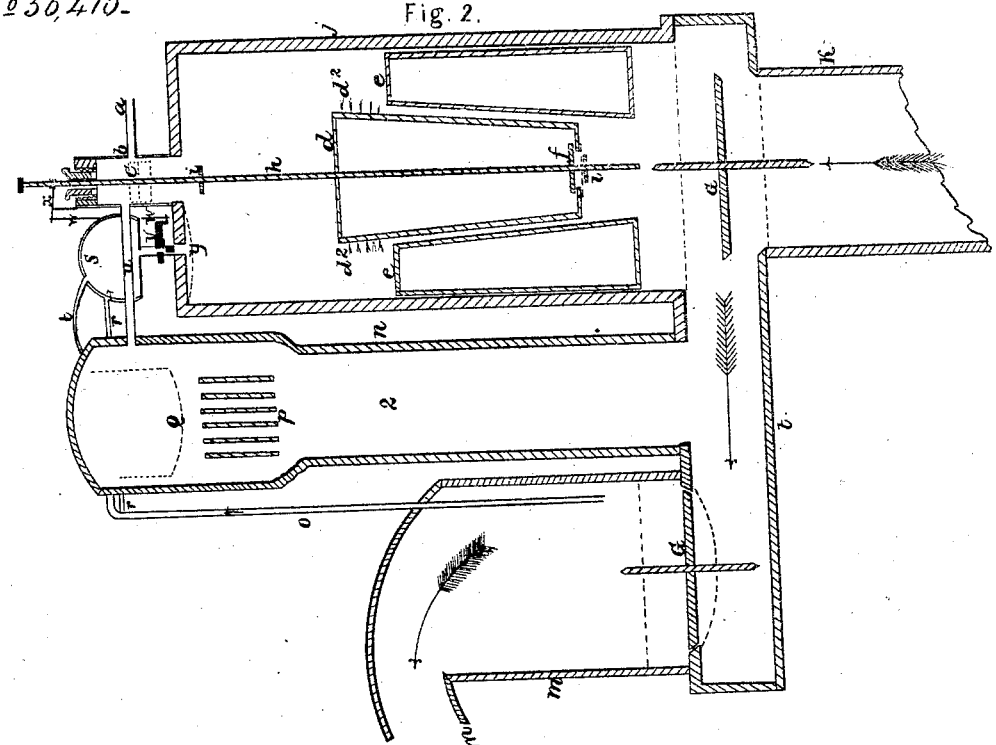
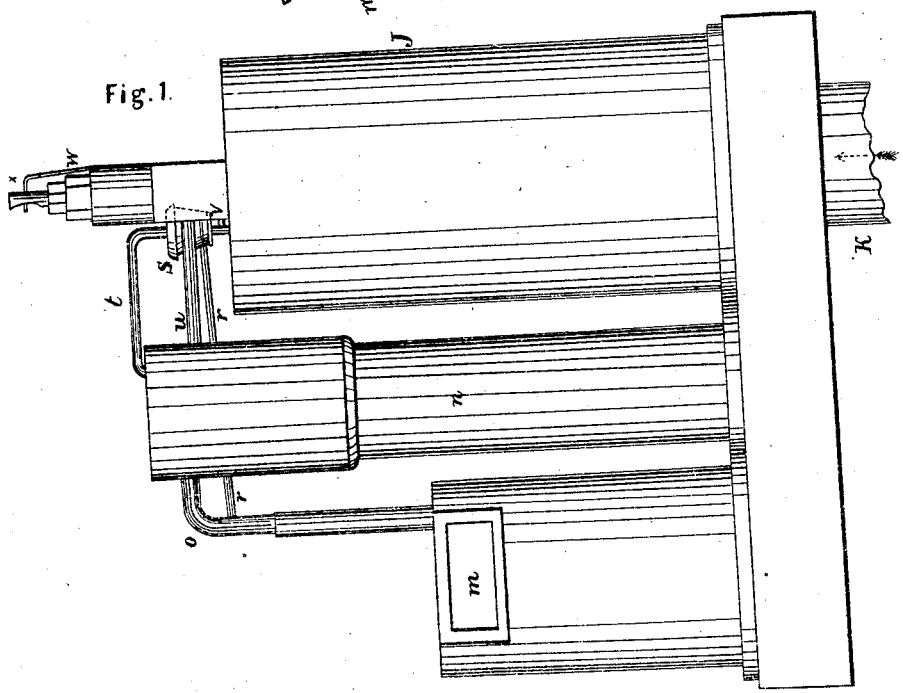
WITNESSES. INVENTOR.
H R Wood W. L. Horne
E J Howland

UNITED STATES PATENT OFFICE.

W. L. HORNE, OF BATAVIA, ILLINOIS.

IMPROVEMENT IN STEAM WATER-POWER DEVICES.

Specification forming part of Letters Patent No. 56,416, dated July 17, 1866.

*To all whom it may concern:*

Be it known that I, W. L. HORNE, of Batavia, in the county of Kane and State of Illinois, have invented a new and useful Mode of Elevating Water to Drive Machinery and other Purposes; and I do hereby declare that the following is a full, clear, and exact description thereof, reference being had to the accompanying drawings, and to the letters of reference marked thereon, making a part of this specification.

The nature of my invention consists in the arrangements and combination of a float to shut off the steam before the water is discharged, a chamber and condenser supplied with cold water, perforated pans, and the mode of throwing jets of water into the cylinder.

Figure 1 represents a side elevation of the machine; Fig. 2, a sectional view.

The steam passes through pipe $a$ into cylinder $j$, taking the place of the water, while it passes out at the discharge-pipe $m$, float D passing down with the water till it strikes button or screw-nut $i$—that is, a regulating screw-nut to regulate the height of the float—closing valve, opening port or valve $u$, and opening stop-cock $v$, allowing the steam to pass from the cylinder $j$ into the condensing-chamber $n$, and the water passing from chamber $s$ into a perforated pan, $y$. Float $e$ moves with the motion of the water, allowing jets $d^2$ of water to pass from the upper end of float D until the steam becomes so reduced as to leave a vacuum in the upper part of cylinder $j$, allowing the cylinder to again fill through the supply-pipe $k$ and valve G by atmospheric pressure, and also allowing chamber $s$ and perforated pan $q$ to take water through pipe O and R from discharge-pipe $m$ by atmospheric pressure, and also allows the water to pass through valve $f$ to replace what had passed out of the jets $d^2$ at the upper end of float D. Lever X and rod $w$ operate stop-cock $v$.

T is a pipe passing from chamber $s$ to condenser $n$ to equalize the vacuum. P is an arrangement of thin wooden slats for creating additional condensing-surface.

While the steam is passing into and taking the place of the water in the cylinder $j$ the condenser $m$ remains full to the top, and when valve C—that is, a cylinder attached to the float-rod $h$—is lowered the steam passes from cylinder $j$ through port $u$ to condenser $n$. Then the water immediately drops down into condenser to figure or letter 2, on a level with discharge-pipe $m$. After the steam is cut off from the cylinder $j$ by float D striking upon the button $i$, the water having been set in rapid motion still continues to flow similar to a hydraulic ram. Thus a ten-horse power steam-boiler will produce twenty-horse water-power by the use of this invention, constructed as described.

What I claim as my invention, and desire to secure by Letters Patent, is—

The arrangement and combination of the float D, chamber $s$, condenser $n$, perforated pans $y$ and $q$, slats $p$, and connected by pipes $u$ and $r$, as herein described, and for the purpose set forth.

W. L. HORNE.

Witnesses:
E. G. HOWLAND,
R. T. FERGUSON.